(12) United States Patent
Mohrschladt et al.

(10) Patent No.: US 6,525,167 B1
(45) Date of Patent: *Feb. 25, 2003

(54) METHOD FOR PRODUCING POLYAMIDE 6 OF A LOW EXTRACT CONTENT, HIGH VISCOSITY STABILITY AND LOW REMONOMERIZATION RATE

(75) Inventors: Ralf Mohrschladt, Schwetzingen (DE); Volker Hildebrandt, Mannheim (DE); Motonori Yamamoto, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/913,122

(22) PCT Filed: Feb. 10, 2000

(86) PCT No.: PCT/EP00/01089

§ 371 (c)(1), (2), (4) Date: Aug. 9, 2001

(87) PCT Pub. No.: WO00/47651

PCT Pub. Date: Aug. 17, 2000

(30) Foreign Application Priority Data

Feb. 11, 1999 (DE) .......................... 199 05 754

(51) Int. Cl.[7] .................. C08G 69/04; C08G 69/08; C08G 69/16
(52) U.S. Cl. .................. 528/310; 528/312; 528/319; 528/320; 528/322; 528/323; 528/324; 528/170
(58) Field of Search ............... 528/170, 310, 528/312, 319, 320, 322, 323, 324

(56) References Cited

U.S. PATENT DOCUMENTS

| 2,245,129 | A | | 6/1941 | Greenwalt | |
| 4,629,776 | A | | 12/1986 | Curatolo et al. | 528/313 |
| 6,288,207 | B1 | * | 9/2001 | Mohrschladt et al. | 528/310 |
| 6,326,460 | B1 | * | 12/2001 | Mohrschladt et al. | 528/492 |
| 6,358,373 | B1 | * | 3/2002 | Leemann et al. | 203/29 |
| 6,359,020 | B1 | * | 3/2002 | Mohrschladt | 521/49.8 |
| 6,362,307 | B1 | * | 3/2002 | Mohrschladt et al. | 528/310 |

* cited by examiner

Primary Examiner—P. Hampton-Hightower
(74) Attorney, Agent, or Firm—Keil & Weinkauf

(57) ABSTRACT

The continuous process for producing polyamides by reacting at least one aminonitrile with water comprises the following steps:

(10) reacting at least one aminonitrile with water at a temperature of from 200 to 290° C. at a pressure of from 40 to 70 bar in a flow tube containing a Brönsted acid catalyst selected from a beta-zeolite, sheet-silicate or metal oxide catalyst in the form of a fixed bed,

(11) diabatically or adiabatically expanding the reaction mixture from step (1) into a first separation zone to a pressure of from 20 to 40 bar, the pressure being at least 10 bar lower than the pressure in step (1), and to a temperature within the range from 220 to 290° C. by flash evaporation and removal of ammonia, water and any aminonitrile monomer and oligomer,

(12) further reacting the reaction mixture from step (2) in the presence of water at a temperature of from 200 to 290° C. and a pressure of from 25 to 55 bar and in the presence or absence of a Brönsted acid catalyst selected from a beta-zeolite, sheet-silicate or metal oxide catalyst in the form of a fixed bed,

(13) diabatically or adiabatically expanding the reaction mixture from step (3) into a second separation zone to a pressure of from 0.01 to 20 bar, the pressure being at least 20 bar lower than the pressure in step (3), and to a temperature within the range from 220 to 290° C. by flash evaporation and removal of ammonia, water and any aminonitrile monomer and oligomer.

5 Claims, No Drawings

METHOD FOR PRODUCING POLYAMIDE 6 OF A LOW EXTRACT CONTENT, HIGH VISCOSITY STABILITY AND LOW REMONOMERIZATION RATE

Nylon-6 is used for the manufacture of fiber, film and moldings. The polymers obtained by melt polymerization include a high level of ε-caprolactam and of low molecular weight reaction products (oligomer) because of the chemical equilibria. Since caprolactam oligomer and caprolactam monomer are soluble and extractable in water, the level of low molecular weight constituents in the polymer is also known as its extractables content.

To prevent any impairment to product quality and processing properties, for example during injection or extrusion molding or during spinning, the extractables content has to be lowered.

The requisite extraction is usually carried out with water at elevated temperatures, as described for example in DE-A-25 01 348 or DE-A-27 32 328. To increase the yield of the polymerization and to avoid any adverse impact on the environment, aqueous extracts are frequently not disposed of as waste, but are recycled.

The lower solubility of oligomer and especially dimer is not the least reason why complicated and energy-intensive processing steps have to be used for the extraction in order that polyamides of satisfactory quality may be obtained. In existing processes, caprolactam monomer is used as a solubilizer for lactam oligomer in the extraction of nylon-6. DE-A-43 24 616 therefore proposes adding caprolactam monomer to the water at the start of the extraction.

Processes are also known in which the extractables content is lowered by vaporizing the monomer and oligomer out of the polymer. DE-A-29 48 865 discloses a demonomerization process wherein the polymer is subjected to a vacuum in the molten state and in the form of thin films.

All the processes mentioned have the disadvantage of requiring in some instances multistage, costly and energy-intensive steps to demonomerize the polymer and to work up the aqueous extract.

A further problem is the change in the product properties on further processing extracted nylon-6 having a low residual extractables content and a defined viscosity. The polymer is usually processed, for example for extrusion or spinning, by reheating and liquefying it. The high temperatures are known to change or increase the viscosity and the residual extractables and residual monomer content. This viscosity instability and remonomerization have an adverse effect not only on processing operations but also on product quality.

It is an object of the present invention to provide a process for producing polyamides which have a reduced extractables and dimer content even in the unextracted state, so that the technical and economic effort needed to extract the low molecular weight constituents and to work up the aqueous extract is reduced, and which, under customary processing temperatures and conditions, have a higher viscosity stability and a lower increase in the residual extractables content than known polyamides.

We have found that this object is achieved according to the invention by a process for producing low-monomer and -oligomer nylon-6 by continuous hydrolytic poly-merization of aminonitriles, preferably ω-aminocapronitrile, ACN in short, and optionally further polyamide-forming monomers in the presence of metal oxides. The metal oxides are used in a form which permits mechanical removal from the reaction mixture.

The novel continuous process for producing polyamides by reacting at least one aminonitrile with water comprises the following steps:

(1) reacting at least one aminonitrile with water at a temperature of from 200 to 290° C. at a pressure of from 40 to 70 bar in a flow tube containing a Brönsted acid catalyst selected from a beta-zeolite, sheet-silicate or metal oxide catalyst in the form of a fixed bed, (2) diabatically or adiabatically expanding the reaction mixture from step (1) into a first separation zone to a pressure of from 20 to 40 bar, the pressure being at least 10 bar lower than the pressure in step (1), and to a temperature within the range from 220 to 290° C. by flash evaporation and removal of ammonia, water and any aminonitrile monomer and oligomer, (3) further reacting the reaction mixture from step (2) in the presence of water at a temperature of from 200 to 290° C. and a pressure of from 25 to 55 bar and in the presence or absence of a Brönsted acid catalyst selected from a beta-zeolite, sheet-silicate or metal oxide catalyst in the form of a fixed bed, (4) diabatically or adiabatically expanding the reaction mixture from step (3) into a second separation zone to a pressure of from 0.01 to 20 bar, the pressure being at least 20 bar lower than the pressure in step (3), and to a temperature within the range from 220 to 290° C. by flash evaporation and removal of ammonia, water and any aminonitrile monomer and oligomer.

The process preferably further includes the following step:

(5) postcondensing the product mixture from step (4) at a temperature of from 230 to 280° C. and a pressure of from 0.01 to 10 bar.

The aminonitrile monomers and oligomers removed by flash evaporation in steps (2) and (4) are preferably returned into the reaction.

According to the invention, the heterogeneous catalysts used can be known metal oxides, such as zirconium oxide, aluminum oxide, magnesium oxide, cerium oxide, lanthanum oxide and preferably titanium dioxide as well as silicates, such as beta-zeolites and sheet-silicates. Particular preference is given to titanium dioxide in the anatase form. The anatase fraction is preferably at least 70% by weight, particularly preferably at least 90%, especially essentially 100%. It was further found that even silica gel, zeolites and doped metal oxides, doped with ruthenium, copper or fluoride, for example, distinctly improve the reaction of the reagents mentioned. Suitable catalysts are particularly notable for the fact that they are slightly Brönsted acidic and have a large specific surface area. According to the invention, the heterogeneous catalyst has a macroscopic form which permits mechanical separation of the polymer melt from the catalyst, for example by means of sieves or filters. The proposal is for the catalyst to be used in extrudate chip form or as coating on packing elements.

The individual process steps will now be more particularly described.

Step (1): Reaction of the reaction mixture in a flow tube which is fitted out with metal oxide catalysts and which is preferably operated as a single liquid phase, at a temperature of from 200 to 290° C., preferably from 210 to 260° C., particularly preferably from 225 to 235° C. The pressure is preferably set to within the range from 20 to 100 bar, especially from 40 to 70 bar. The catalyst material is present as a fixed bed and remains in the reactor.

Step (2): The pressurized reaction mixture is subsequently expanded adiabatically into a separation zone. The pressure in this separation zone is generally within the range from 20 to 40 bar, preferably within the range from 25 to 35 bar. The residence time in this first separation zone is generally within the range from 0.5 to 5 hours, preferably from 2 to 4 hours, while the temperature should be within the range from 220 to 290° C., preferably from 240 to 270° C. The process of expansion is accompanied by a flash evaporation (utilizing the heat stored in the reaction mixture) of ammonia and water quantities still present in the reaction mixture. They contain volatile constituents such as aminocapronitrile monomer and oligomer. Rectification via a column can be used to remove the water and ammonia vapors from the system and return the organics into the process, preferably into step 1.

Step (3): The pressurized mixture is subsequently transferred via a heat exchanger, together with added, likewise preheated water, into a further reactor, where it is further reacted at temperatures of from 200 to 290° C., preferably from 210 to 260° C., particularly preferably from 225 to 235° C. The pressure in the reactor is preferably again set so that the reaction mixture is present as a single liquid phase. The pressure is generally within the range from 25 to 55 bar, preferably within the range from 30 to 45 bar. If desired, this stage likewise contains the aforementioned heterogeneous metal oxide catalysts, which are separated in the form of a fixed bed from the product stream and remain in the reactor of the third stage.

Step (4): The pressurized reaction mixture is subsequently expanded adiabatically into a second separation zone. The pressure in this separation zone is generally within the range from 0.01 to 20 bar, preferably within the range from 0.1 to 10 bar, while the temperature is within the range from 220 to 280° C., preferably from 230 to 250° C. The residence time here is generally within the range from 0.5 to 10 hours, preferably from 2 to 8 hours. The process of expansion is accompanied by a flash evaporation whereby a portion of the ammonia and water quantities present in the reaction mixture are liberated utilizing the heat of the reaction mixture. They contain volatile constituents such as aminocapronitrile monomer and oligomer. Rectification via a column can be used to remove the water and ammonia vapors from the system and return the organics into the process, preferably into step 1.

Step (5): The reaction mixture is then preferably transferred into a postreaction zone, where the product mixture is postcondensed at a temperature of from 220 to 280° C., preferably from 240 to 250° C.

This process of reheating the reaction mixture followed by a flash evaporation can be repeated, if necessary. The amount of water evaporated in the various separation zones and the associated lowering in the temperature can be specifically controlled through the particular pressure established. The advantage is that, owing to this adiabatic separation or vaporization from the reaction mixture, no oligomers or additives can separate out on apparatus and heat exchanger surfaces, thus preventing fouling by volatile organic and inorganic components.

In another preferred embodiment, the expanding reaction mixture has energy supplied to it through heat exchangers. The removal of the gas phase may be effected by using stirred or unstirred separating tanks or tank batteries and also by the use of evaporator apparatuses, for example by means of circulatory evaporators or thin-film evaporators, filmtruders or by annular disk reactors, which ensure an enlarged phase interface. Recirculation of the reaction mixture or the use of a loop reactor may be necessary to enlarge the phase interface. Furthermore, the removal of the gas phase can be furthered by the addition of water vapor or inert gas into the liquid phase.

As customary additives and fillers there may be used pigments, such as titanium dioxide, silicon dioxide or talc, chain regulators, such as aliphatic and aromatic carboxylic and dicarboxylic acids, such as propionic acid or terephthalic acid, stabilizers, such as copper(I) halides and alkali metal halides, nucleating agents, such as magnesium silicate or boron nitride, further, homogeneous catalysts, such as phosphorous acid, and also antioxidants in amounts within the range from 0 to 5% by weight, preferably from 0.05 to 1% by weight, based on the total amount of monomers. Further suitable additives and comonomers are described in DE-A-197 09 390. The additives are generally added prior to the pelletizing and before, during or after, preferably after, the polymerization. It is particularly preferable to add the additives to the reaction mixture only after it has passed through the reaction zones which contain the heterogeneous catalysts.

In a particularly preferred embodiment, chain regulators and other additives are added after the second reaction stage (separation zone) and before or in the third reaction stage. This has the advantage that the chain regulators can be dissolved directly in the water which is continuously fed into the third reaction stage.

The polymer obtained according to the invention can then be further processed according to. customary methods, for example converted into piece form in a conventional manner by melt-extruding it in the form of profiles, which are quenched in a waterbath and then pelletized. The pellets can then be conventionally extracted and subsequently or simultaneously converted into high molecular weight polyamide. The extraction can be effected for example with water or aqueous caprolactam solution. Another possibility is gas phase extraction as described for example in EP-A-0 284 968. The desired viscosity number for the end product is generally within the range from 120 to 350 ml/g. It can be set in a conventional manner.

The invention also provides for the use of metal oxides as heterogeneous catalysts in a process for producing polyamides by reaction of aminonitriles and water by using the metal oxides in a form which permits mechanical removal from the reaction mixture and removing them from the reaction mixture during or after the reaction, to reduce the level of extractables, to increase the viscosity stability and to lower the remonomerization rate in the polyamide obtained.

The metal oxide catalysts are preferably used in the form of granules, extrudates, fixed beds or catalyst-coated packing elements or internals.

The process of the invention is more particularly described by the examples hereinbelow. Unless otherwise stated, all quantities and percentages in the description and the claims are by weight. The aminocapronitrile used has a purity of 99.9% by weight and contains 250 ppm of tetrahydroazepine.

EXAMPLE 1

A reaction solution of aminocapronitrile and water (molar mixing ratio ACN/water=1:6) is pumped to a heated heat exchanger and heated to the desired reaction temperature within a few minutes. The pressure side of the feed pump is set to about 50 bar to ensure that the reaction system forms a single phase. The heated reaction mixture is subsequently pumped through a heated cylindrical tube having an internal diameter of 36 mm and a length of 1000 mm. The tube is packed with catalyst pellets prepared from titanium dioxide from Finnti, type S150, and having a diameter of 4 mm and a length within the range from 5 to 20 mm. The titanium dioxide, which has a specific surface area of about 100 m$^2$/g, is present in the anatase form and is held by sieves in the reaction tube and separated from the exiting product stream. For flash evaporation, the reaction mixture, which is under a pressure of about 50 bar, is continuously expanded, at the end of the tube, via a control valve into a heated cylindrical separation vessel and to a pressure of from 30 to 35 bar (see table). The reaction mixture forms two phases in the process, so that the water and ammonia quantities present in the mixture can pass into the gas phase. After a 3 h residence in the separation vessel, which also serves as postreaction zone, the polymer is continuously pumped, by a melt pump, from the base region of the postreactor into a second heated cylindrical tube having an internal diameter of 36 mm and a length of 1000 mm, at a pressure within the range from 30 to 45 bar (see table). The tube is likewise packed with the abovementioned catalyst pellets. The second flash evaporation is effected by expanding the reaction mixture via a control valve into a second cylindrical receiving vessel and pressures of from 1 to 2 bar. The separation vessel is also the location for the postreaction and especially the postcondensation of the reaction solution, so that, after a residence time of from 4 to 7 hours, the polymer obtained may be continuously discharged by a melt pump from the base region of the reactor via a die into a waterbath in the form of profiles, consolidated in the waterbath and pelletized.

The process parameters are listed in Table 1. The results show that the corresponding polyamides have a low extractables content within the range from 9.0 to 9.8% by weight. The fraction of low molecular weight constituents in the polyamides produced according to the invention is distinctly lower than in polyamides obtained from caprolactam by conventional melt polymerization in a VK tube, described in DE-A-14 95 198, EP-A-0 462 476 and EP-A-0 020 946. These have an extractables content of about 11% by weight.

EXAMPLE 2

A reaction solution of aminocapronitrile and water (molar mixing ratio ACN/water=1:6) is pumped to a heated heat exchanger and heated to the desired reaction temperature within a few minutes. The pressure side of the feed pump is set to about 50 bar to ensure that the reaction system forms a single phase. The heated reaction mixture is subsequently pumped through a heated cylindrical tube having an internal diameter of 36 mm and a length of 1000 mm. The tube is packed with catalyst pellets prepared from titanium dioxide from Finnti, type S150, and having a diameter of 4 mm and a length within the range from 5 to 20 mm. The titanium dioxide, which has a specific surface area of about 100 m$^2$/g, is present in the anatase form and is held by sieves in the reaction tube and separated from the exiting product stream. For flash evaporation, the reaction mixture, which is under a pressure of about 50 bar, is continuously expanded, at the end of the tube, via a control valve into a heated cylindrical separation vessel and to a pressure of from 30 to 40 bar (see also Table 2). The reaction mixture forms two phases in the process, so that the water and ammonia quantities present in the mixture can pass into the gas phase. After a 3 h residence in the separation vessel, which also serves as postreaction zone, the polymer is continuously pumped, by a melt pump, from the base region of the postreactor into a second heated cylindrical tube having an internal diameter of 36 mm and a length of 1000 mm, at a pressure within the range from 30 to 45 bar (see table). The tube is packed with Raschig rings (diameter 6 mm, length 6 mm). As well as the product stream from the separation vessel, a preheated aqueous solution, which in some process designs contains chain regulators such as adipic acid and triacetonediamine, is pumped into the second tube reactor.

The second flash evaporation is effected by expanding the reaction mixture via a control valve into a second cylindrical receiving vessel to a pressure of 3 bar. After a residence time of 4 hours the reaction mixture is expanded by means of a further melt pump through a control valve into a third separator under a pressure between the pressure side of the pump and the control valve sufficiently high for the mixture again to form a single liquid phase. The last separation vessel is also the location, at a pressure of 1.2 bar, for the postreaction and especially the postcondensation of the reaction solution, so that, after a residence time of 3 hours, the polymer obtained can be continuously discharged by a melt pump from the base region of the reactor via a die into a waterbath in the form of profiles, consolidated in the waterbath and pelletized.

The process parameters are listed in Table 2. The results show that the corresponding polyamides have a low extractables content. The fraction of low molecular weight constituents in the polyamides produced according to the invention is again distinctly lower than in polyamides obtained from caprolactam by conventional melt polymerization in a VK tube.

TABLE 1

| | Stage 1<br>Tubular reactor | | | Stage 2<br>Flash evaporation/<br>separator | | | Stage 3<br>Tubular reactor | | | Stage 4<br>Flash evaporation/<br>separator | | | Product* | |
|---|---|---|---|---|---|---|---|---|---|---|---|---|---|---|
| Run<br>No. | VWD<br>[h] | T<br>[° C.] | Pressure<br>[bar] | VWD<br>[h] | T<br>[° C.] | Pressure<br>[bar] | T<br>[° C.] | VDW<br>[h] | Pressure<br>[bar] | VWD<br>[h] | T<br>[° C.] | Pressure<br>[bar] | RV | Extractables<br>[%] |
| 1 | 2 | 230 | 50 | 3 | 260 | 30 | 230 | 4 | 34 | 7 | 240 | 0.7 | 1.88 | 9.50 |
| 2 | 2 | 230 | 50 | 3 | 260 | 30 | 230 | 4 | 34 | 4 | 240 | 0.7 | 1.87 | 9.37 |
| 3 | 2 | 230 | 50 | 3 | 260 | 30 | 230 | 4 | 34 | 4 | 240 | 0.3 | 1.86 | 9.36 |
| 4 | 2 | 220 | 50 | 3 | 260 | 30 | 230 | 4 | 34 | 7 | 240 | 0.3 | 2.00 | 9.10 |
| 5 | 2 | 240 | 50 | 3 | 260 | 30 | 230 | 4 | 34 | 7 | 240 | 0.3 | 1.89 | 9.06 |
| 6 | 2 | 250 | 50 | 3 | 260 | 30 | 230 | 4 | 34 | 7 | 240 | 0.3 | 1.88 | 9.30 |
| 7 | 2 | 260 | 54 | 3 | 260 | 30 | 230 | 4 | 34 | 7 | 240 | 0.3 | 1.82 | 9.27 |
| 8 | 2 | 220 | 50 | 3 | 253 | 35 | 227 | 4 | 39 | 7 | 241 | 0.3 | 1.92 | 9.87 |

TABLE 1-continued

| | Stage 1 Tubular reactor | | | Stage 2 Flash evaporation/ separator | | | Stage 3 Tubular reactor | | | Stage 4 Flash evaporation/ separator | | | Product* | |
|---|---|---|---|---|---|---|---|---|---|---|---|---|---|---|
| Run No. | VWD [h] | T [° C.] | Pressure [bar] | VWD [h] | T [° C.] | Pressure [bar] | T [° C.] | VDW [h] | Pressure [bar] | VWD [h] | T [° C.] | Pressure [bar] | RV | Extractables [%] |
| 9  | 2 | 220 | 50 | 3 | 253 | 30 | 227 | 4 | 34 | 7 | 242 | 0.3 | 1.72 | 9.60 |
| 10 | 2 | 260 | 55 | 3 | 260 | 35 | 230 | 4 | 39 | 7 | 240 | 0.3 | 1.72 | 9.83 |

VWD: residence time
T: temperature
RV: relative viscosity
*after extraction and drying
Pressure: overpressure

TABLE 2

| | Stage 1 Tubular reactor | | | Stage 2 Flash evaporation/ separator | | | Stage 3 Tubular reactor | | | | | Stage 4 Flash evaporation/ separator | | | Stage 5 | | | Product*** | |
|---|---|---|---|---|---|---|---|---|---|---|---|---|---|---|---|---|---|---|---|
| | | | | | | | H₂O/ regu- | | | Pres- | | | | | | | | | Extrac- |
| Run No. | VWD [h] | T [° C.] | Pressure [bar] | VWD [h] | T [° C.] | Pressure [bar] | lator add** | VWD [h] | T [° C.] | sure [bar] | VWD [h] | T [° C.] | Pressure [bar] | VWD [h] | T [° C.] | Pressure [bar] | RV | ables [%] |
| 11 | 1 | 240 | 50 | 3 | 263 | 35 | 1 | 2 | 230 | 40 | 4 | 240 | 3.0 | 3 | 250 | 0.15 | 2.00 | 9.90 |
| 12 | 1 | 240 | 50 | 3 | 263 | 35 | 2 | 2 | 223 | 40 | 4 | 240 | 3.0 | 3 | 250 | 0.15 | 1.98 | 10.27 |
| 13 | 1 | 240 | 50 | 3 | 263 | 35 | 2 | 2 | 230 | 40 | 4 | 240 | 3.0 | 3 | 250 | 0.15 | 1.99 | 9.93 |
| 14 | 1 | 240 | 50 | 3 | 263 | 35 | 2 | 2 | 240 | 40 | 4 | 240 | 3.0 | 3 | 250 | 0.15 | 1.94 | 10.13 |
| 15 | 1 | 240 | 50 | 3 | 263 | 35 | 2 | 2 | 250 | 40 | 4 | 240 | 3.0 | 3 | 250 | 0.15 | 1.95 | 10.07 |
| 16 | 1 | 240 | 50 | 3 | 263 | 35 | 2 | 2 | 250 | 35 | 4 | 240 | 3.0 | 3 | 250 | 0.15 | 1.97 | 9.50 |

RV: relative viscosity
T: temperature
VWD: residence time
**1:5% of water + 0.29% of triacetonediamine   2:5% of water + 0.29% of triacetonediamine + 0.3% of adipic acid
***after extraction and drying
Pressure: overpressure Viscosity Stability of Exemplary Products The viscosity stability is a measure of the spontaneous molecular weight buildup of the polymer in the liquid and solid phase. The greater the stability, the smaller the change in the product viscosity within a finite time interval for which the polymer is present in the molten state, for example for further processing. A high viscosity stability is extremely important and desirable for many applications, since it ensures consistent product properties and minimizes the effect of processing operations on the viscosity.

The measured results hereinbelow show that the polyamides produced according to the invention have a higher viscosity stability than conventionally polymerized comparative polyamides.

Measurement of Viscosity Stability

The products directly polymerized from ACN according to the invention are extracted with water and dried under reduced pressure. The relative solution viscosity (RV) is then determined in 1% strength by weight solution in 96% strength by weight sulfuric acid at 25° C.

For comparison, caprolactam is conventionally hydrolytically polycondensed for a length of time such that the product viscosities correspond to the viscosities of the polyamides produced from ACN.

To be able to assess the viscosity stability, not only the solution viscosities but also the melt viscosities of all product samples—produced from ACN or from caprolactam—are redetermined following aging for 15 and 25 minutes at 270° C. The melt viscosities are determined using a capillary rheometer at 270° C. and a shear gradient of 100/s.

TABLE 3

| | | | Measurements of viscosity stability | | | |
|---|---|---|---|---|---|---|
| | Starting product | | After 15 min aging at 270° C. | | After 25 min aging at 270° C. | |
| From run no. | RV¹ | Residual moisture [%] | SV² [dPas] | RV¹ | SV² [dPas] | RV¹ |
| 9 | 1.74 | 0.029 | 40 | 1.84 | 60 | 1.84 |
| Comparison 1 (caprolactam) | 1.75 | 0.065 | 250 | 2.07 | 380 | 2.21 |
| 8 | 1.93 | 0.059 | 220 | 2.05 | 320 | 2.08 |
| Comparison 2 (caprolactam) | 1.93 | 0.046 | 420 | 2.21 | 550 | 2.30 |
| 4 | 2.04 | 0.041 | 340 | 2.13 | 370 | 2.16 |
| Comparison 3 (caprolactam) | 2.05 | 0.039 | 600 | 2.30 | 790 | 2.42 |

¹RV = relative viscosity (in solution);
²SV = melt viscosity

As the above table shows, the viscosity changes which the products produced from ACN undergo in the liquid (melt) phase are distinctly smaller than those of the conventional polyamides from caprolactam.

Residual Extractables Content of an Exemplary Product

The extracted and dried chips of the exemplary product from run 4 are tempered in a tumble dryer in a nitrogen stream at 160° C. After a tempering time of 24 hours, the polymer attains a relative viscosity of 2.7.

To determine the residual extractables content, i.e., the extractables content of previously extracted samples, the chips are reextracted with methanol. To this end, about 15 g of the polyamide sample are analytically weighed into an extraction sleeve and Soxhlett-extracted with 200 ml of methanol for 16 h. The methanol in the extract is subsequently distilled off at 50° C. and about 100 mbar in a rotary evaporator, so that the residual extractables can be determined gravimetrically. Care is taken to ensure that no monomer is lost in the course of the distillation of the methanol.

Remonomerization of an Exemplary Product

To measure the remonomerization rate, the change in the residual extractables content after 10 minutes' aging of the polymer in the molten state at temperatures of 240 and 270° C. is investigated. To this end, the polyamide chips are melted in a viscometer (rheograph) at 240° C. or 270° C. for 10 min, and the residual extractables content of the product, extruded in filamentary form, is subsequently redetermined using the above method. The comparison in the extractables increase in the polyamide produced from aminocapronitrile with the product synthesized conventionally from caprolactam shows that the increase in the residual extractables content and thus the remonomerization rate in the polymer produced according to the invention is distinctly slower or less.

TABLE 4

| | Comparative example | From run No. 4 |
|---|---|---|
| Relative viscosity | 2.7 | 2.7 |
| Increase in extractables at 240° C. (g/100 g) | 0.76 | 0.49 |
| Increase in extractables at 270° C. (g/100 g) | 1.02 | 0.81 |

We claim:

1. A continuous process for producing polyamides by reacting at least one aminonitrile with water, comprising the following steps:

(1) reacting at least one aminonitrile with water at a temperature of from 200 to 290° C. at a pressure of from 40 to 70 bar in a flow tube containing a Bronsted acid catalyst selected from a beta-zeolite, sheet-silicate or metal oxide catalyst in the form of a fixed bed, (2) diabatically or adiabatically expanding the reaction mixture from step (1) into a first separation zone to a pressure of from 20 to 40 bar, the pressure being at least 10 bar lower than the pressure in step (1), and to a temperature within the range from 220 to 290° C. by flash evaporation and removal of ammonia, water and any aminonitrile monomer and oligomer, (3) further reacting the reaction mixture from step (2) in the presence of water at a temperature of from 200 to 290° C. and a pressure of from 25 to 55 bar and in the presence or absence of a Brönsted acid catalyst selected from a beta-zeolite, sheet-silicate or metal oxide catalyst in the form of a fixed bed, (4) diabatically or adiabatically expanding the reaction mixture from step (3) into a second separation zone to a pressure of from 0.01 to 20 bar, the pressure being at least 20 bar lower than the pressure in step (3), and to a temperature within the range from 220 to 290° C. by flash evaporation and removal of ammonia, water and any aminonitrile monomer and oligomer.

2. A process as claimed in claim 1, further comprising the following step:

(5) postcondensing the product mixture from step (4) at a temperature of from 230 to 280° C. and a pressure of from 0.01 to 10 bar.

3. A process as claimed in claim 1, wherein the aminonitrile monomers and oligomers removed by flash evaporation in steps (2) and (4) are returned into the reaction.

4. A process as claimed in claim 1, wherein the reaction mixture in steps (1) and (3) is present as a single liquid phase.

5. A process as claimed in claim 1, wherein an aminonitrile used is aminocapronitrile.

* * * * *